United States Patent
Chintalapudi et al.

(10) Patent No.: US 9,883,383 B1
(45) Date of Patent: Jan. 30, 2018

(54) SECURE NEAR FIELD COMMUNICATIONS

(71) Applicant: Microsoft Technology Licensing, LLC, Redmond, WA (US)

(72) Inventors: Krishna Kant Chintalapudi, Bellevue, WA (US); Nissanka Arachchige Bodhi Priyantha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/418,590

(22) Filed: Jan. 27, 2017

(51) Int. Cl.
| | |
|---|---|
| *H04M 1/66* | (2006.01) |
| *H04W 12/02* | (2009.01) |
| *H04W 4/00* | (2009.01) |
| *H04W 12/04* | (2009.01) |
| *H04B 5/00* | (2006.01) |

(52) U.S. Cl.
CPC .......... *H04W 12/02* (2013.01); *H04B 5/0031* (2013.01); *H04B 5/0037* (2013.01); *H04W 4/008* (2013.01); *H04W 12/04* (2013.01)

(58) Field of Classification Search
CPC ..... H04W 12/02; H04W 4/008; H04W 12/04; H04W 4/00; H04B 4/0031; H04B 5/0037; H04B 5/0056; H04B 5/0031; H04B 5/00; H04B 5/0062; G06K 7/10366; G06K 7/0008; H04K 1/02; H04K 1/10; H04K 3/41
USPC ...................... 455/411; 379/355.09; 307/10.5
See application file for complete search history.

(56) References Cited

U.S. PATENT DOCUMENTS

| | | | |
|---|---|---|---|
| 2006/0183462 A1* | 8/2006 | Kolehmainen | H04B 5/00 455/411 |
| 2007/0026825 A1 | 2/2007 | Wilson | |
| 2009/0041241 A1* | 2/2009 | Dobyns | H04B 5/0031 380/252 |
| 2010/0045441 A1* | 2/2010 | Hirsch | H04B 5/0012 340/10.1 |
| 2010/0190436 A1* | 7/2010 | Cook | H04B 5/00 455/41.1 |
| 2011/0275316 A1* | 11/2011 | Suumaki | G06K 7/10237 455/41.1 |

(Continued)

FOREIGN PATENT DOCUMENTS

| | | | | |
|---|---|---|---|---|
| EP | 2816737 A1 | 12/2014 | | |
| EP | 2816737 B1 * | 6/2016 | ........... | H04B 5/0031 |
| WO | 2013138867 A1 | 9/2013 | | |

OTHER PUBLICATIONS

"Wimbeep", https://sites.google.com/site/wimbeep/, Retrieved on: Nov. 28, 2016, 1 page.

(Continued)

*Primary Examiner* — Mahendra Patel

(57) ABSTRACT

The security of Near Field Communications (NFC) against eavesdroppers is improved by encoding a hidden key, private to an initiating device, onto the carrier wave when a target device communicates its data via the carrier. The initiating device, in possession of the hidden key, is enabled to undo the scrambling effects of the hidden key to thereby privately interpret the data encoded onto the carrier wave by the target device. In various aspects, the hidden key is a one-time-use key that is randomly generated, used, and then discarded, preventing malicious parties from gaining the hidden key to later interpret intercepted data signals.

20 Claims, 12 Drawing Sheets

(56) References Cited

U.S. PATENT DOCUMENTS

| | | | |
|---|---|---|---|
| 2011/0320293 A1* | 12/2011 | Khan | G06Q 20/0457 |
| | | | 705/16 |
| 2012/0032632 A1* | 2/2012 | Soar | H01F 38/14 |
| | | | 320/108 |
| 2012/0330764 A1 | 12/2012 | Nahidipour | |
| 2013/0005246 A1* | 1/2013 | Waters | H04L 69/24 |
| | | | 455/41.1 |
| 2013/0130614 A1 | 5/2013 | Busch-sorensen | |
| 2013/0165040 A1 | 6/2013 | Mcintyre et al. | |
| 2013/0288599 A1 | 10/2013 | Bernard et al. | |
| 2013/0344805 A1* | 12/2013 | Lefley | H04B 5/0031 |
| | | | 455/41.1 |
| 2014/0040509 A1* | 2/2014 | Stedman | G06F 1/1632 |
| | | | 710/8 |
| 2015/0038074 A1 | 2/2015 | Buckley et al. | |
| 2015/0105016 A1 | 4/2015 | Lefley | |
| 2015/0180546 A1* | 6/2015 | Dhayni | H04B 5/0031 |
| | | | 455/41.1 |
| 2015/0372720 A1* | 12/2015 | Shimshoni | H04B 5/0056 |
| | | | 455/41.1 |
| 2016/0242124 A1* | 8/2016 | Zhou | G06K 7/0008 |
| 2016/0300417 A1* | 10/2016 | Hatton | G07C 9/00857 |

OTHER PUBLICATIONS

"Zoosh", http://www.naratte.com/, Retrieved on: Nov. 28, 2016, 2 pages.

"Advanced Encryption Standard (AES)", In Publication of Federal Information Processing Standards, Nov. 26, 2001, 51 pages.

"Near Field Communication Interface and Protocol (NFCIP-1)", http://www.ecmainternational.org/publications/standards/Ecma-340.htm, Published on: Jun. 2013, 52 pages.

"NFC-SEC", In ECMA White Paper, Dec. 9, 2008, 6 pages.

"NFC-SEC-01: NFC-SEC Cryptography Standard using ECDH and AES", http://www.ecma-international.org/publications/standards/Ecma-386.htm, Published on: Jun., 2015, 26 pages.

"NFC-SEC: NFCIP-1 Security Services and Protocol", https://www.ecma-international.org/publications/standards/Ecma-385.htm, Published on: Jun. 2015, 24 pages.

"Start-Up Naralle Launches Novel Ultrasonic Near-Field Communications Solution", http://www.bdti.com/InsideDSP/2011/07/28/Naratte, Published on: Jul. 28, 2011, 2 pages.

Clark, Sarah, "Berg: 86% of POS terminals in North America will accept NFC payments by 2017", http://www.nfcworld.com/2012/06/07/316112/berg-86-percent-of-pos-terminals-in-north-america-will-accept-nfc-payments-by-2017/, Published on: Jun. 7, 2012, 3 pages.

"At Villanova University, NFC Technology Being Tested", http://facilityexecutive.com/2012/03/at-villanova-university-nfc-technology-being-tested/, Published on: Mar. 23, 2012, 2 pages.

Clark, Sarah, "NFC specialist Tapit to raise US$8m for international expansion", http://www.nfcworld.com/2012/07/261317057/nfc-specialisftapit-to-raise-us8m-for-international-expansion/, Published on: Jul. 26, 2012, 3 pages.

Gollakota, et al., "They Can Hear Your Heartbeats: Non-Invasive Security for Implanted Medical Devices", In Proceedings of ACM SIGCOMM Conference, Aug. 15, 2011, pp. 2-13.

Haselsteiner, et al., "Security in Near Field Communication (NFC)", In Proceedings of Workshop on RFID Security, Jul. 12, 2006, pp. 1-11.

Jain, et al., "Practical, Real-time, Full Duplex Wireless", In Proceedings of 17th Annual International Conference on Mobile Computing and Networking, Sep. 19, 2011, pp. 301-312.

Jana, et al., "On the Effectiveness of Secret Key Extraction from Wireless Signal Strength in Real Environments", In Proceedings of 15th Annual International Conference on Mobile Computing and Networking, Sep. 20, 2009, pp. 321-332.

Kortvedt, et al., "Eavesdropping Near Field Communication", In Norwegian Information Security Conference, Nov. 2009, pp. 57-68.

Madhavapeddy, et al., "Audio Networking: The Forgotten Wireless Technology", In Journal of IEEE Pervasive Computing, Jul. 2005, pp. 55-60.

Martinovic, et al., "Jamming for Good: A Fresh Approach to Authentic Communication in WSNs", In Proceedings of Second ACM Conference on Wireless Network Security, Mar. 16, 2009, pp. 161-168.

Mathur, et al., "Radio-telepathy: Extracting a Secret Key from an Unauthenticated Wireless Channel", In Proceedings of 14th ACM International Conference on Mobile Computing and Networking, Sep. 14, 2008, pp. 128-139.

Shannon, C. E., "Communication Theory of Secrecy Systems", In Bell Systems Technical Journal, vol. 28, Oct. 1949, pp. 656-715.

Wyner, A. D., "The Wire-Tap Channel", In Bell Systems Technical Journal, vol. 54, No. 8, Oct. 1975, pp. 1355-1387.

Nandakumar, et al., "Dhwani: Secure Peer-to-Peer Acoustic NFC", In Proceedings of ACM SIGCOMM Conference, Aug. 12, 2013, 12 pages.

* cited by examiner

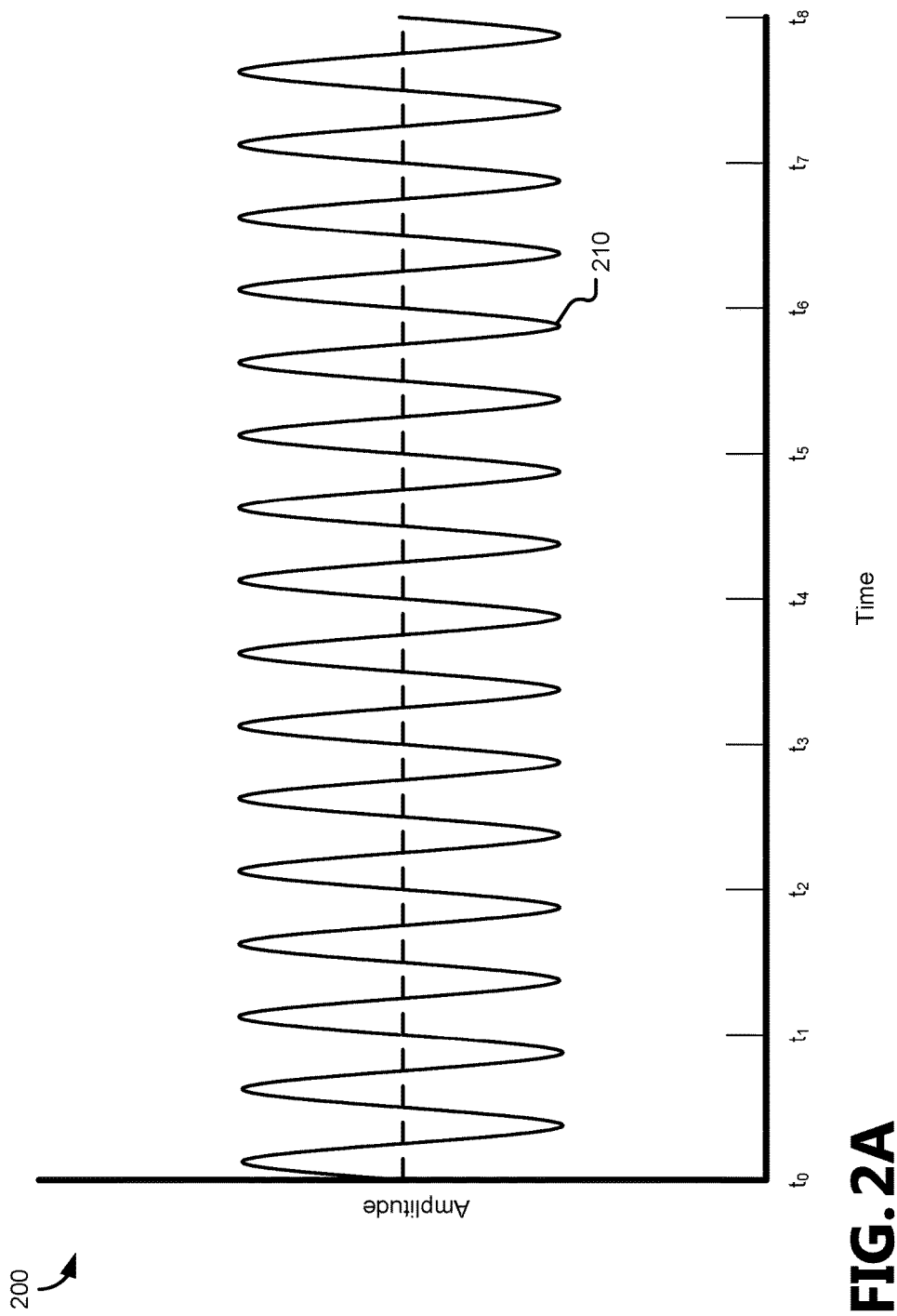

SECURE NEAR FIELD COMMUNICATIONS

BACKGROUND

Near Field Communications (NFC) include several standards by which two devices in close proximity to one another may exchange information wirelessly. These standards, which include ISO/IEC 18092, specify several aspects of establishing a connection between the devices and how data are to be exchanged. NFC has historically relied on proximity as a security feature, but as malicious parties and eavesdroppers gain greater sophistication in their receiving hardware and in disguising devices to implement man-in-the-middle attacks at the point of data exchange, additional security features are needed to maintain confidence in the privacy of NFC transactions. One such security feature is to encrypt the signals passed between the devices via secret keys; however, encryption adds processing overhead (slowing communications) and is vulnerable to the secret keys being exposed.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices including instructions for providing secure Near Field Communications (NFC) are discussed herein. One of the benefits of NFC is that its handshake process between two communicating devices is fast, so that two devices may exchange data quickly. Unfortunately, part of that speed is realized by foregoing an authentication (e.g., a username/password pair) of the communicating devices and instead relying on the short range of the communications to exclude malicious parties or eavesdroppers.

To provide greater security, while retaining the speed benefits inherent to NFC, the present disclosure provides for the actively communicating device in a pair of communicating devices to randomly modulate the magnetic carrier by which the devices communicate. The passively communicating device encodes its data onto the carrier oblivious to the modulation, and the actively communicating device maintains a cache of the modulations so that their effect on the communications from the passively communicating device can be removed by the actively communicating device. The actively communicating device receives data from the passively communicating device that is interpretable by the actively communicating device, but eavesdropping devices receive a signal that is scrambled and uninterpretable. The actively communicating device privately maintains the hidden key used to modulate the carrier, and may discard the key as the signal is interpreted to forgo the possibility that an eavesdropped may recover the hidden key and thereby interpret intercepted messages.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-2G are examples of spectrograms interpreting a Near Field Communication signal;

DETAILED DESCRIPTION

Figure 1:
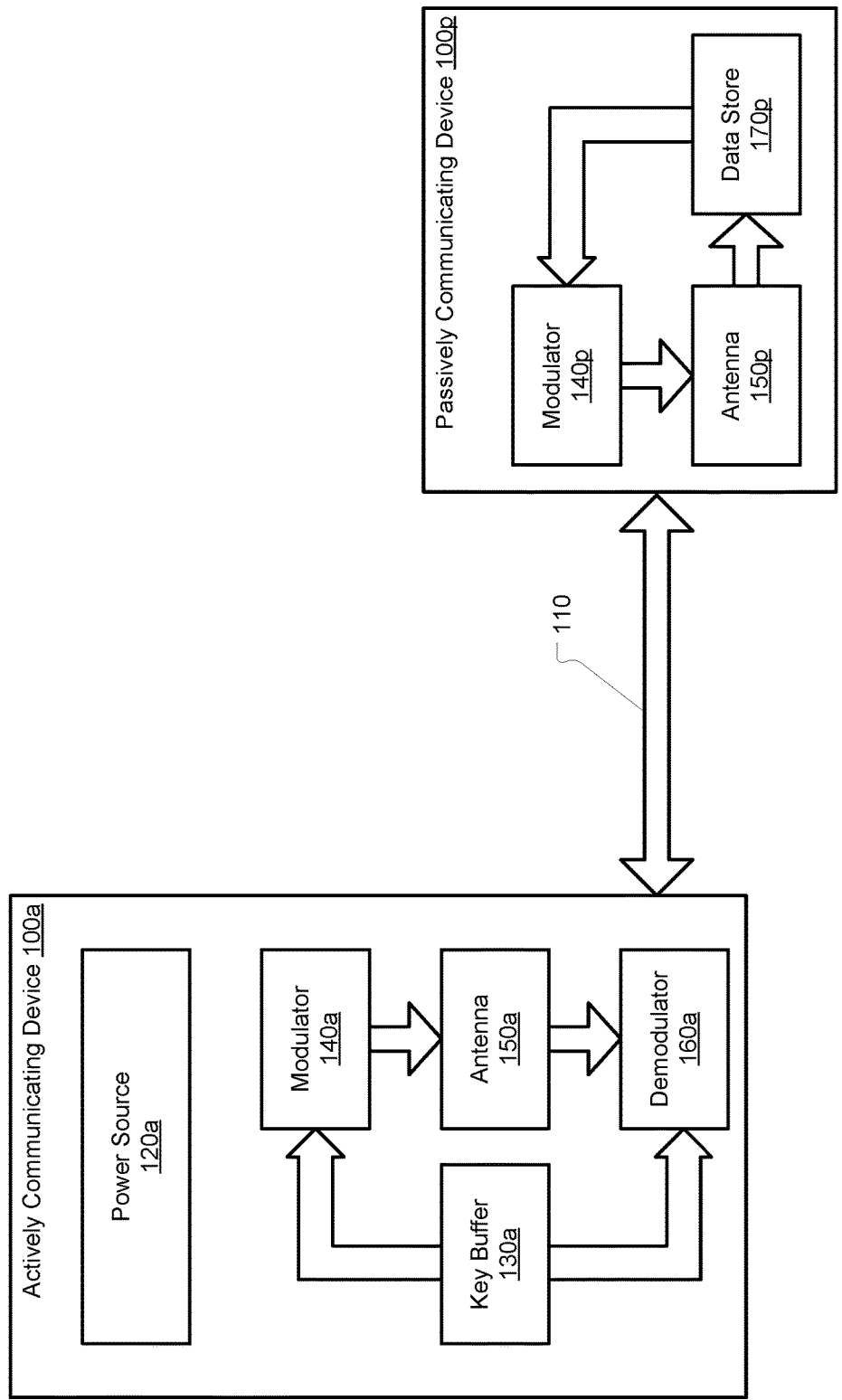
FIG. 1 illustrates two devices communicating via Near Field Communications.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 illustrates an actively communicating device 100*a* (i.e., an initiator) in communication with a passively communicating device 100*p* (i.e., a target) via a magnetic carrier 110 according to an NFC standard, such as, for example, ISO/IEC 18092. In various aspects, the passively communicating device 100*p* may be a passive device (with no power source of its own) or an active device communicating as a passive device and therefore may include any of the components illustrated for the actively communicating device 100*a*. For example, the passively communicating device 100*p* may be a credit card and the actively communicating device 100*a* a credit card reader, or the passively communicating device 100*p* may be a first mobile telephone and the actively communicating device 100*a* a second mobile telephone.

In various examples, the actively communicating device 100*a* and the passively communicating device 100*p* are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, gaming devices, key fobs and cards, and mainframe computers. The hardware of these computing systems is discussed in greater detail in regard to FIGS. 4, 5A, and 5B.

The actively communicating device 100a includes a power source 120a, a key buffer 130a, a modulator 140a, an antenna 150a, and a demodulator 160a. The power source 120a in various aspects may be a battery or an electrical connection to an external power source, such as, for example, a wall socket or another device (e.g., when the actively communicating device 100a is an attachment or dongle for a computer to enable that computer to communicate via NFC). The power source 120a provides power to the other components of the actively communicating device 100a to generate, modulate, and interpret NFC signals, and in some aspects provides power, carried by the magnetic carrier 110, to the passively communicating device 100p to induce it to generate and modulate NFC signals.

The modulator 140a is configured to generate the magnetic carrier 110 via the antenna 150a and encode data onto it. In various aspects, the data encoded into the magnetic carrier 110 include signals used for initiating communications with other communicating devices 100 as well as the hidden key. For example, a handshake signal or response request signal may be encoded onto the magnetic carrier 110 by the modulator 140a to induce the passively communicating device 100p to provide the information it stores to the actively communicating device 100a. In another example, while the passively communicating device 100p encodes its information onto the magnetic carrier 110, the actively communicating device 100a will encode the hidden key onto the magnetic carrier 110 to secure the information from eavesdroppers. In some aspects, the modulator 140a begins encoding the hidden key onto the magnetic carrier 110 in response to a timed delay from the end of a handshake procedure or a start-of-signal message from the passively communicating device 100p. Similarly, in different aspects, the modulator 140a ceases encoding the hidden key onto the magnetic carrier 110 in response to reaching a message length previously encoded onto the magnetic carrier 110, reaching an end of the hidden key, or receiving an end-of-signal message from the passively communicating device 100p.

In some aspects, the hidden key is modulated onto the magnetic carrier for the duration that the passively communicating device 100p encodes information onto the magnetic carrier 110. In other aspects, the modulator 140a encodes the hidden key onto the magnetic carrier 110 for a longer period of time than the passively communicating device 100p transmits its information (e.g., starting in anticipation of message encoding, continuing after message encoding) to further disguise the message encoded by the passively communicating device 100p. In yet other aspects, the modulator 140a encodes the hidden key onto the magnetic carrier 110 for a shorter period of time (e.g., starting after a first bit is received, ending after a payload is completely received but not an end-of-signal-message).

The demodulator 160a is configured to observe the magnetic carrier 110 as received by the antenna 150a to interpret information encoded onto the magnetic carrier 110. In various aspects, the demodulator 160a is communicated to the modulator 140a to alert the modulator 140a of received messages (e.g., start-of-signal, end-of-signal, etc.). In other aspects, the demodulator 160a is communicated to a memory storage device and a processor so that information received from the passively communicating device 100p may be acted upon by the actively communicating device 100a. For example, the demodulator 160a may pass a credit card number received from a passively communicating device 100p of a smart card to a memory storage device and processor for use to determine whether to authorized a transaction using that smart card.

The demodulator 160a is configured to unscramble the information received from the passively communicating device 100p from the effects of the hidden key also modulated onto the magnetic carrier 110. In various aspects, the demodulator 160a uses the hidden key to produce a version of the magnetic carrier 110 without the effects of the hidden key, which is compared against a static threshold to determine a binary value encoded by the passively communicating device 100p in a given time frame on the magnetic carrier 110. In other aspects, the demodulator 160a determines a binary value encoded by the passively communicating device 100p onto the magnetic carrier 110 in light of the hidden key by modulating a threshold according to the hidden key to provide a threshold that changes to match the effects of the hidden key during a given time frame of transmission.

In some aspects, the demodulator 160a may also perform error correction on the received information (e.g., using a check sum or error correction code) and frame synchronization procedures on the magnetic carrier 110 (adjusting when the modulator 140a sends a next bit or a phase of the magnetic carrier 110), or may signal the modulator 140a that an error has occurred in the reception of information from the passively communicating device 100p. For example, when random errors (e.g., bit flips) are intentionally introduced to further obfuscate the message, the demodulator 160a may apply a Reed Solomon code to correct these intentional errors.

In various aspects, the modulator 140a and the demodulator 160a are part of a single device or may be two separate devices. Similarly, in various aspects, the modulator 140a and the demodulator 160a may be configured for various modulation schemes, including Amplitude Modulation (AM), Frequency Modulation (FM), and Phase Modulation (PM), which encode and decode data onto and from a carrier by changing an amplitude of the carrier, a frequency of a carrier, and a phase of a carrier respectively according to the information to transmit. One of ordinary skill in the art will be familiar with various modulation schemes and the interpretation thereof.

The key buffer 130a is in communication with the modulator 140a and the demodulator 160a, and is configured to store a hidden key for protecting the information exchanged from the passively communicating device 100p to the actively communicating device 100a from eavesdroppers and other malicious parties. In various aspects, the key buffer 130a includes a random number generator that is used to produce a series of bits with random binary values to comprise the hidden key. In some aspects, the hidden key is produced on demand—where a bit is produced to encode the magnetic carrier 110 for a given time frame, to interpret the magnetic carrier 110 at the given time frame, and then discarded once the given time frame has been interpreted. A given bit may be discarded by overwriting it with a next bit in the hidden key, shifting a register to queue the next bit in the series comprising the hidden key for use by the actively communicating device 100a, or by erasing it from the key buffer 130a. In other aspects, the key buffer 130a is provided a hidden key for repeated use, which may be hardcoded to the actively communicating device 100a or provided for a given communications session. The hidden key is kept privately by the actively communicating device 100a and is not shared to the passively communicating device 100p, which may encode its information to the magnetic carrier 110 oblivious to the modulation effects imparted by the actively communicating device 100a according to the hidden key.

The passively communicating device 100p includes a data store 170p, a modulator 140a, and an antenna 150p. The modulator 140p and antenna 150p of the passively communicating device 100p operate similarly to the modulator 140a and antenna 150a of the actively communicating device 100a, except that they do no generate the magnetic carrier 110, but piggyback the passively communicating device's information onto the magnetic carrier 110 generated by the actively communicating device 100a; modulating it to carry the information for reception by the actively communicating device 100a. The antennas of the devices 100 effectively form a transformer when the devices 100 are in proximity and magnetically coupled to one another. In various aspects, the data store 170p of the passively communicating device 100p is a passive data store (e.g., an identifier number on a key fob, and account number of a credit card) hard coded onto a chip, or an active data store (e.g., a register in computer memory that is provided for communication between the devices. The passively communicating device 100p receives the magnetic carrier 110 generated by the actively communicating device 100a and modulates that magnetic carrier 110 via the modulator 140p according to the information stored in the data store 170p to affect the magnetic carrier 110.

Each communicating device 100 alternates when it encodes information for interpretation by the other communicating device 100. In various aspects, a guard time between encoded signals ensures that the communicating devices 100 do not "talk over" one another, which may be signaled by an end of frame signal and/or a message length indicator encoded onto the magnetic carrier 110 when a given communicating device 100 encodes information for the other communicating device 100. The hidden key, however, is not meant for interpretation by the passively communicating device 100p or any other device—it is private to the actively communicating device 100a—and is encoded onto the magnetic carrier 110 by the actively communicating device 100a during the time period that the passively communicating device 100p encodes its information onto the magnetic carrier 110; safeguarding that information from eavesdroppers.

In various aspects, the magnetic carrier 110 transfers power from the actively communicating device 100a to the passively communicating device 100p to induce the modulator 150p to encode the information in the data store 170p onto the magnetic carrier 110.

FIGS. 2A-2G are example spectrograms 200 interpreting an NFC signal. Although examples are given herein primarily in terms of Amplitude Modulation (AM), the present disclosure is not limited to application in AM devices. The present disclosure is envisioned as being equally applicable to other modulation schemes, including, but not limited to: Frequency Modulation (FM) and Phase Modulation (PM).

As will also be appreciated, although the example spectrograms 200 are shown as idealized sine and square waves for purposes of illustration, several wave types that are non-idealized are possible and envisioned for use with the present disclosure including, but not limited to: sine, sawtooth (forward or reverse biased), square, and triangular. Additionally, although interpretation of the signals is shown via on-off keying, other interpretation schemes (e.g., differential encoding) are also envisioned for use with the present disclosure. Further, it will be appreciated that the constant amplitudes shown are idealized, and a dip in amplitude is expected when communicating devices 100 come into proximity to one another due to the increased load on the actively communicating device 100a to induce passive mode communications from the passively communicating device 100p, especially when the passively communicating device 100p moves relative to the actively communicating device 100a.

FIG. 2A illustrates an example carrier wave 210 as a sine wave. In the ISO/IEC 18092 standard for NFC, the carrier wave 210 will have a frequency of 13.56 MHz and an operating volume (i.e., signal amplitudes) for its field strength between 1.5 and 7.5 A/m in un-modulated conditions, although other communication standards that employ the present disclosure may use different frequencies and operating volumes for the carrier wave 210. The actively communicating device 100a generates the carrier wave 210 for use as the magnetic carrier 110, which is induced on the passively communicating device 100p to encode data onto, which is then read by the actively communicating device 100a.

Figure 2B:
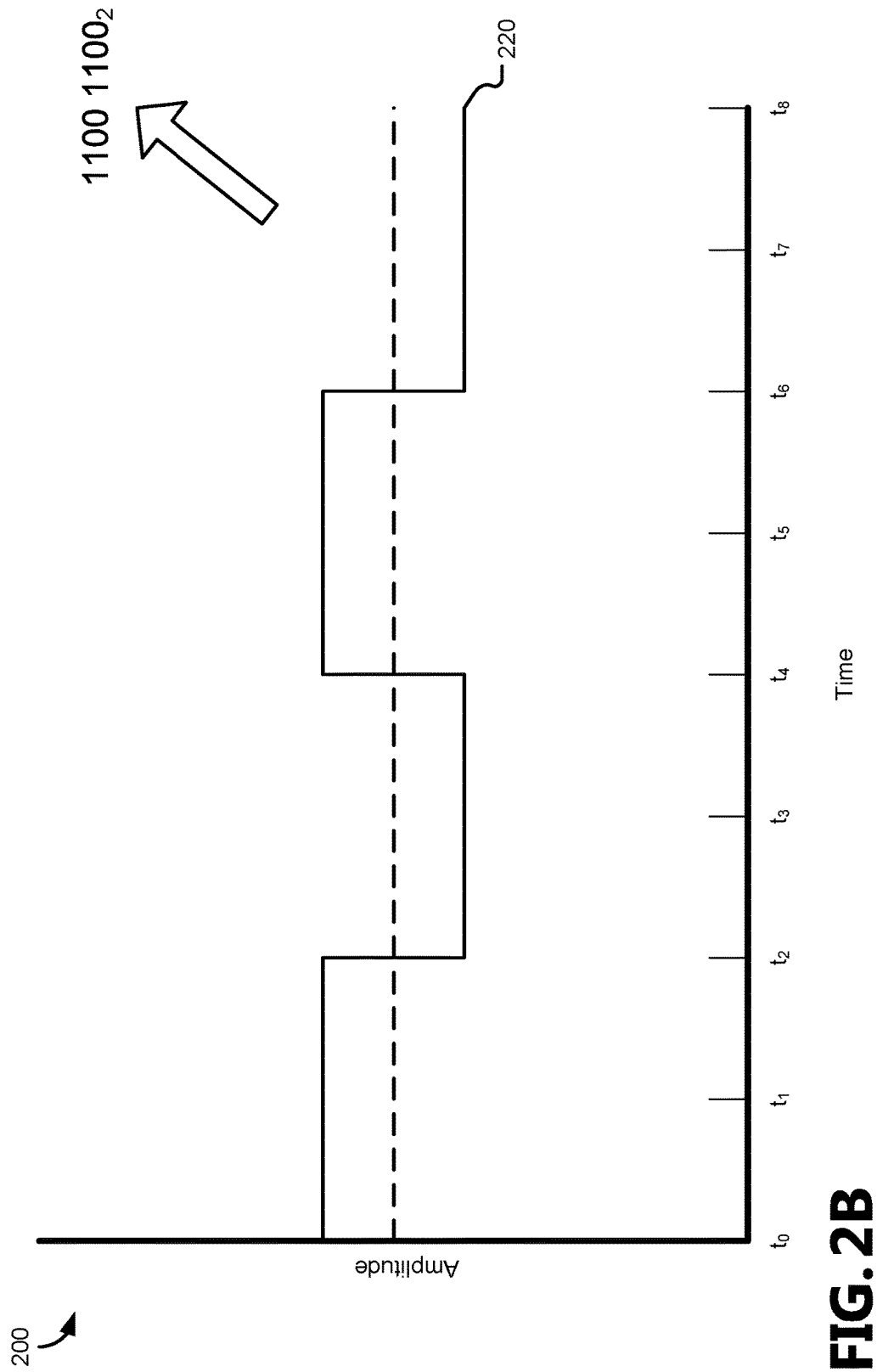

FIG. 2B illustrates an example data signal 220 from a passively communicating device 100p. The data signal 220 encodes information stored in the data store 170p as a time series comprising several time frames in which individual bits are encoded. Each of the spectrograms 200 in FIGS. 2A-G are shown over a time period from an initial time ($t_0$) to a final time ($t_8$) to illustrate examples via the transmissions and interpretations of an eight-bit byte. During each time frame (e.g., between $t_0$ and $t_1$, $t_1$ and $t_2$, $t_2$ and $t_3$, etc.), the passively communicating device 100p may encode a bit onto the carrier wave 210. Depending on the bit-rate set for transmission, the actual duration of a time frame may vary in different aspects.

Eight time frames are illustrated in the spectrograms 200 to illustrate the encoding and transmission of a byte. In the present disclosure, to differentiate decimal and binary representations of numbers, binary numbers are presented in eight-bit bytes with a space between each group of four bits and a subscript two following the second group (e.g., $0000\ 0000_2$ is the binary representation of zero for purposes of the present disclosure). The values of individual bits are discussed as being ONE/TRUE, ZERO/FALSE, or UNKNOWN. As illustrated in FIG. 2B, the data signal 220 represents $1100\ 1100_2$ (decimal 204), where the bits for the first, second, fifth, and sixth time frames are ONE/TRUE and the bits for the third, fourth, seventh, and eighth time frames are ZERO/FALSE.

Figure 2C:
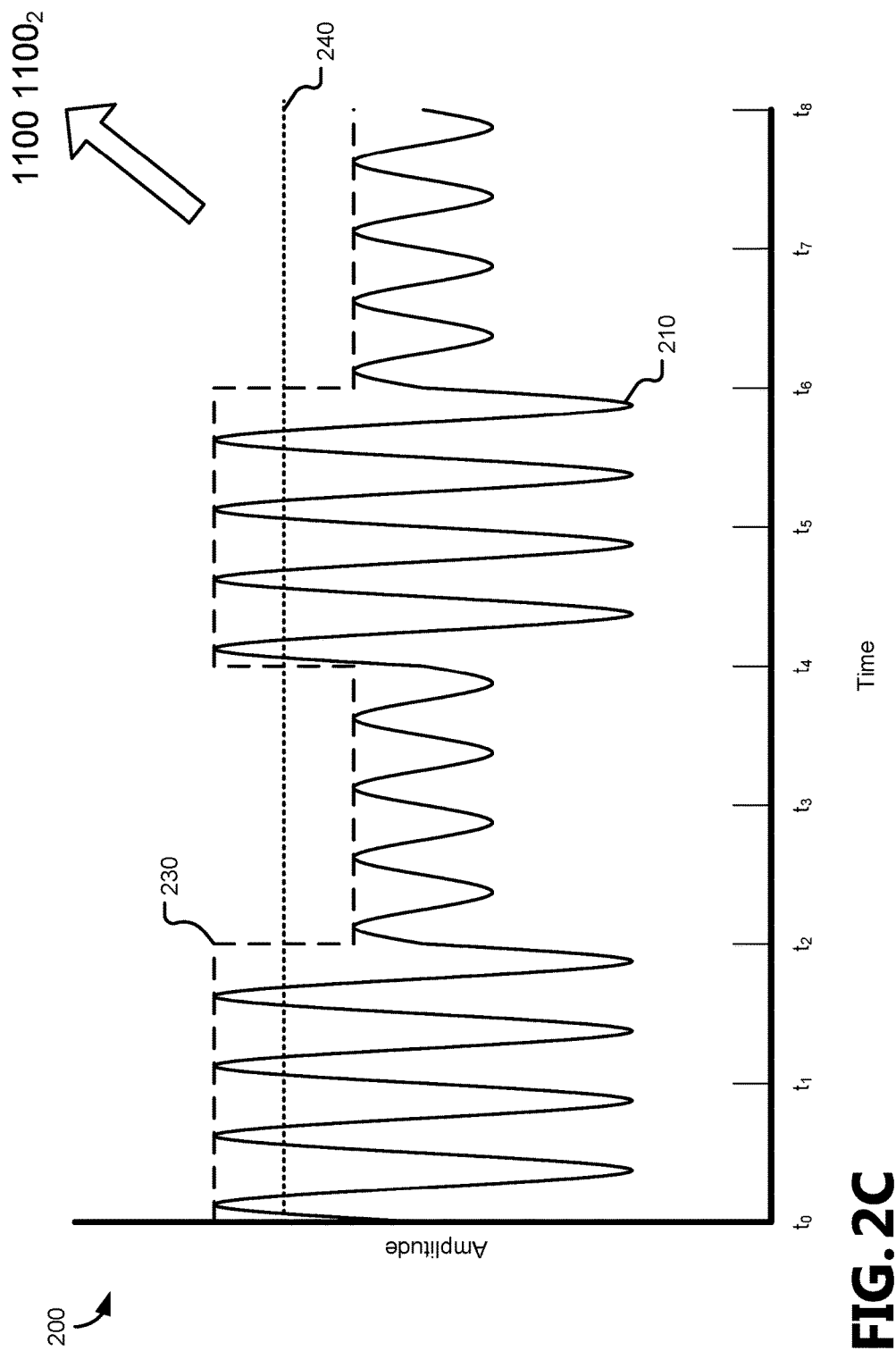

FIG. 2C illustrates the carrier wave 210 of FIG. 2A as modulated by the example data signal 220 of FIG. 2B. In the current example, the amplitude of the carrier wave 210 has been modulated to encode $1100\ 1100_2$ from the data signal 220 of FIG. 2B. The actively communicating device 100a constructs an observed message 230 from the modulated carrier wave 210 according to one or more sampling methods and encoding methods. As illustrated, the observed message 230 reconstructs the data signal 220 of FIG. 2B, which is interpreted against a decoding threshold 240 to extract the data encoded onto the carrier wave 210. As will be understood in an AM implementation, values above the decoding threshold 240 are interpreted to be ONE/TRUE and values below the decoding threshold 240 are interpreted to be ZERO/FALSE. Similar thresholds for frequency or phase changes are set for interpreting signals sent via FM and PM schemes.

In various aspects, the decoding threshold 240 may include an uncertainty range, such that any value within the uncertainty range from the decoding threshold 240, despite falling on one side or the other of the decoding threshold, is determined to be UNKNOWN as its position relative to the decoding threshold 240 is too close to accurately determine the true value of a corresponding bit.

The decoding threshold 240 is set, as illustrated in FIG. 2C, based on the modulated operating volume to determine whether the observed message 230 in a given time frame represents a ONE/TRUE or a ZERO/FALSE. Unfortunately, any device within range to receive the modulated carrier wave 210 of FIG. 2C may reconstruct the data encoded by the passively communicating device 100$p$ onto the carrier wave 210; not just the actively communicating device 100$a$.

Figure 2D:
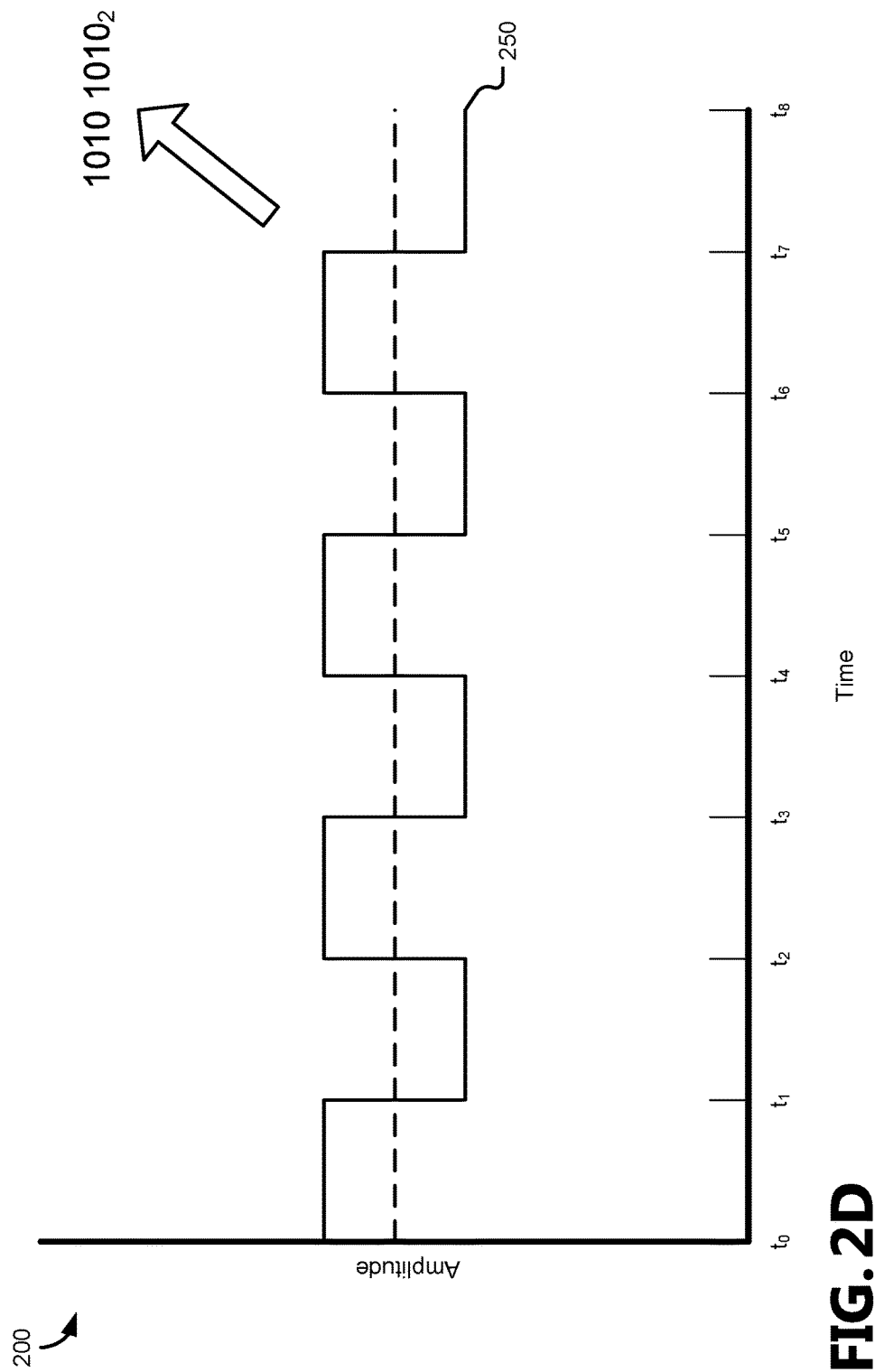

FIG. 2D illustrates an example hidden key signal 250. Although shown with a similar amplitude to the data signal 220 of FIG. 2B and with similar amplitudes internally between each time frame, the strength of the hidden key signal 250 may vary from the strength of the data signal 220 and the amplitude of each time frame may also vary. For example, although only two amplitudes are illustrated in FIG. 2D, multiple different amplitudes that affect the carrier wave 210 to different extents when encoded thereon may be applied. Additionally, the maximum amplitude of the hidden key signal 250 is set such that the modulated signal will conform to the upper and lower power bands of the applicable standard of communication, and in some aspects is set as close as possible to the modulation depth (differentiating bits of different values in an AM scheme) to provide greater confusion between message values intercepted by an eavesdropper.

Figure 2E:
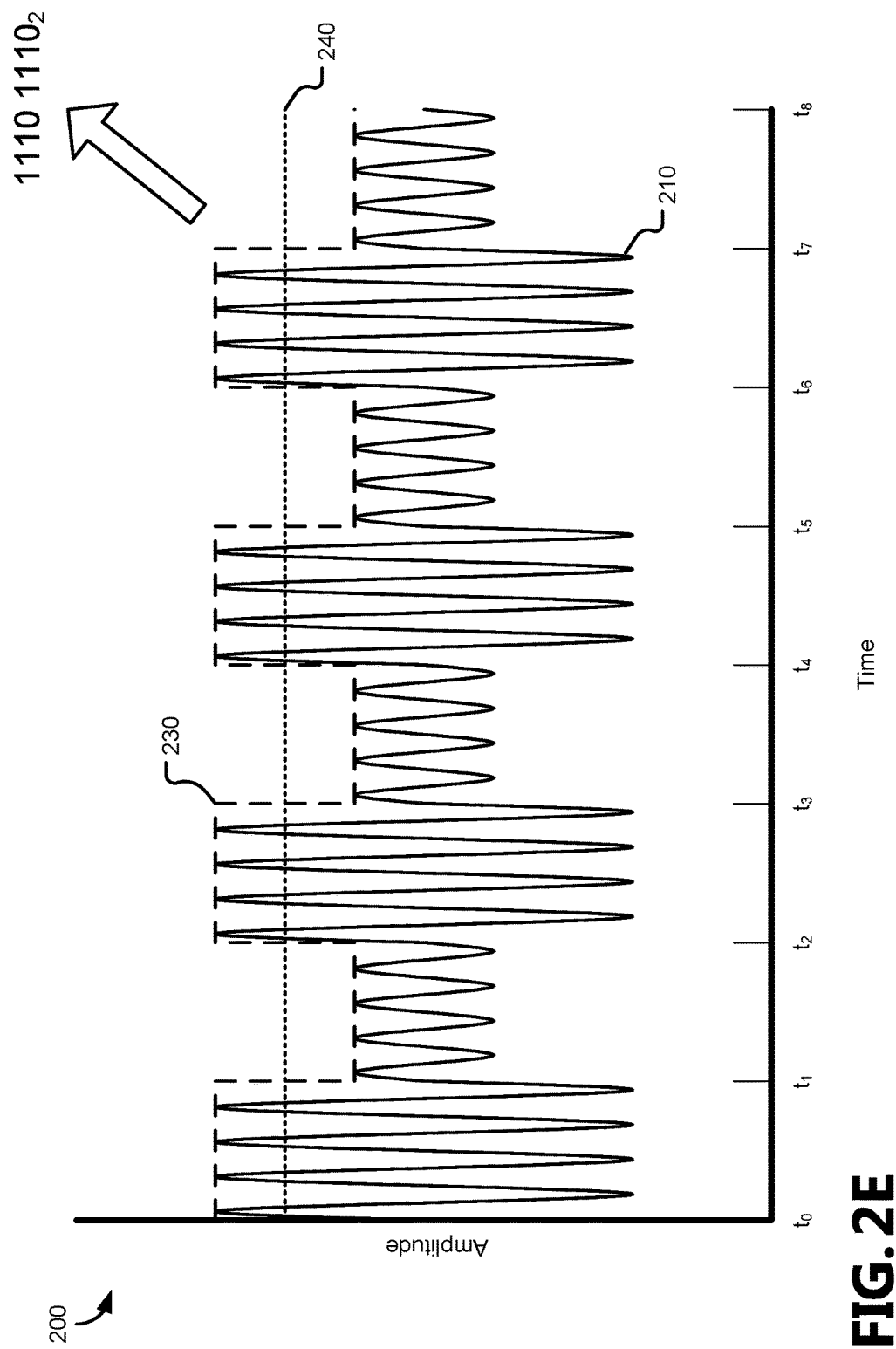

The hidden key signal 250, as illustrated, represents 1010 $1010_2$ (decimal 170). The values of at least a portion of the bits of the hidden key signal 250 are stored in the key buffer 140$a$ of the actively communicating device 100$a$ for use in modulating the carrier wave 210 to secretly secure the transmission of data from the passively communicating device 100$p$ and to demodulate the observed message 230 when it has been secretly secured. FIG. 2E illustrates the carrier wave 210 as modulated by the hidden key signal 250, which if interpreted by another device would produce an observed message matching the hidden key signal 250, which if interpreted against the appropriate decoding threshold 240 would yield the hidden key value of 1010 $1010_2$. Because the carrier wave 210 as modulated by the hidden key signal 250 should not be transmitted without the passively communicating device 100$p$ also modulating the carrier wave 210 according to the data signal 220, the observed signal 230 should not match the hidden signal 250; the spectrogram 200 of FIG. 2E is provided as an illustrative example to discuss the internal operation of the actively communicating device 100$a$.

Figure 2F:
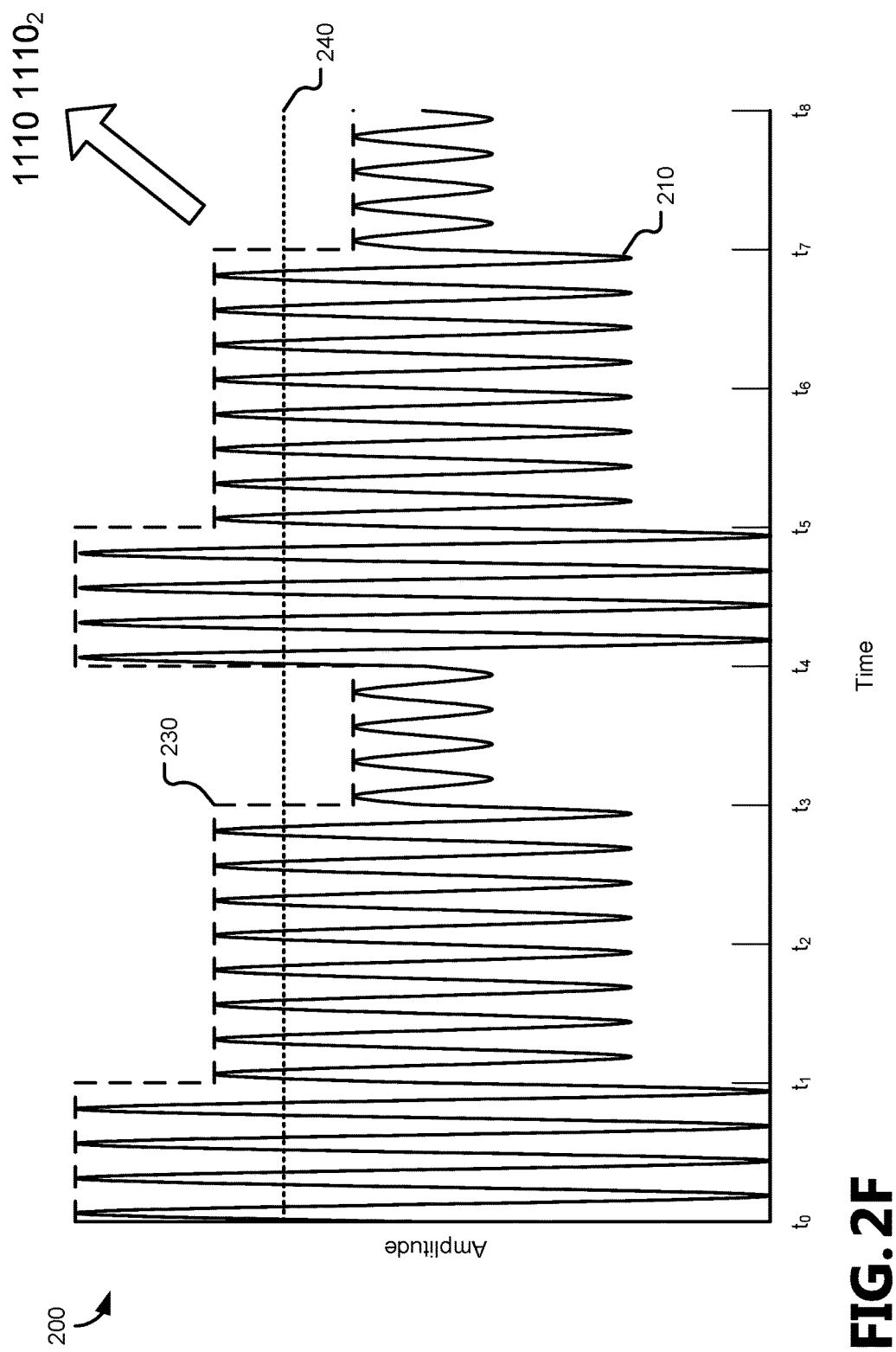
Figure 2G:
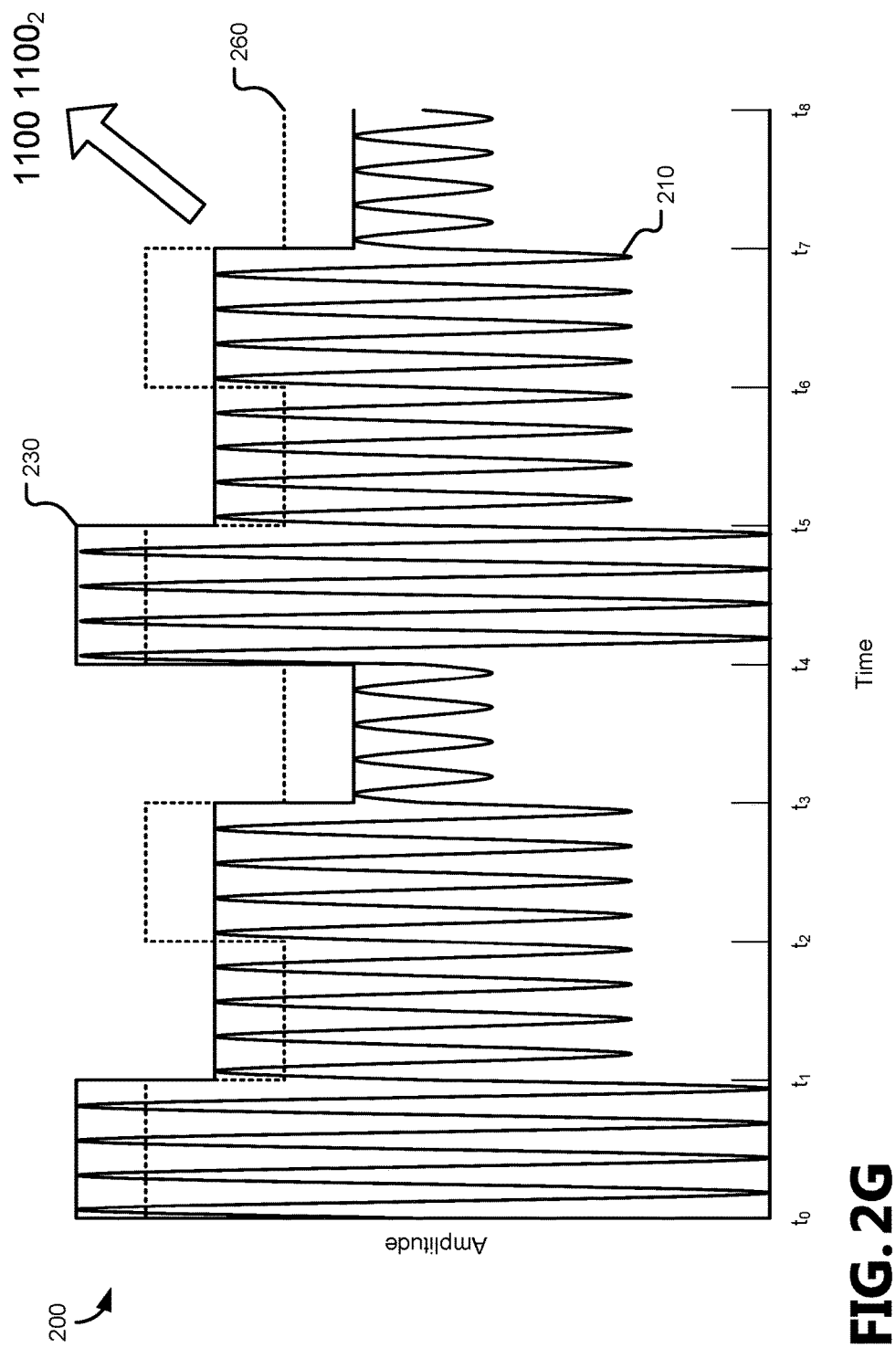

FIGS. 2F and 2G illustrate the carrier wave 210 of FIG. 2A as modulated by the example data signal 220 of FIG. 2B and the hidden key signal 250 of FIG. 2D. As will be apparent, the observed message 230 in FIGS. 2F and 2G shows more than two amplitude levels to which the carrier wave 210 has been modulated. In the illustrated examples, when the corresponding bits from data signal 220 and the hidden key signal 250 are both ONE/TRUE or ZERO/FALSE, the resulting amplitude in the observed message 230 may be resolved to properly to return the corresponding bit from the data signal 220. When the corresponding bits from data signal 220 and the hidden key signal 250 have different values, however, the resulting amplitude in the observed message 230 cannot be reliably resolved to the value of the data signal 220 without knowledge of the values of the hidden key signal 250. An eavesdropper who observes the carrier wave 210 and attempts to interpret the observed message 230 to extract the transmitted data therefore would misinterpret the transmitted data or determine the value of such bits to be UNKNOWN. For example, if the eavesdropper used the prior decoding threshold 240, as is shown in FIG. 2F, the observed message 230 would be incorrectly interpreted to be 1110 $1110_2$ (decimal 238). In another example, if the eavesdropper were to set the decoding threshold 240 evenly between the high value and the low value of the observed message 230, half of the bits would be interpreted as UNKNOWN (i.e., bits two, three, six, and seven in the illustrated example), leaving the transmitted value ambiguous to the eavesdropper.

In various aspects, to interpret the observed message 230 in light of the hidden key, the actively communicating device 100$a$ may either modulate the decoding threshold 240 by the hidden key signal 250 to produce the modulated threshold 260 shown in FIG. 2G or demodulate the observed message 230 by the hidden key signal 250 to revert the observed message of FIGS. 2F and 2G to that shown in FIG. 2C (and then use the static decoding threshold 240 to interpret the carrier wave 210 and produce the data signal 230). As illustrated in FIG. 2G, the modulated threshold 260 changes as the carrier wave 210 was changed by its modulation by the hidden key signal 250, thus allowing the threshold by which the observed message 230 is decoded to shift, privately, on the actively communicating device 100$a$ to correctly interpret the data signal 220 as 1100 $1100_2$ in FIG. 2G as opposed to 1110 $1110_2$ in FIG. 2F without having to expose or leave the hidden key open to exposure to any potential eavesdroppers.

Figure 3:
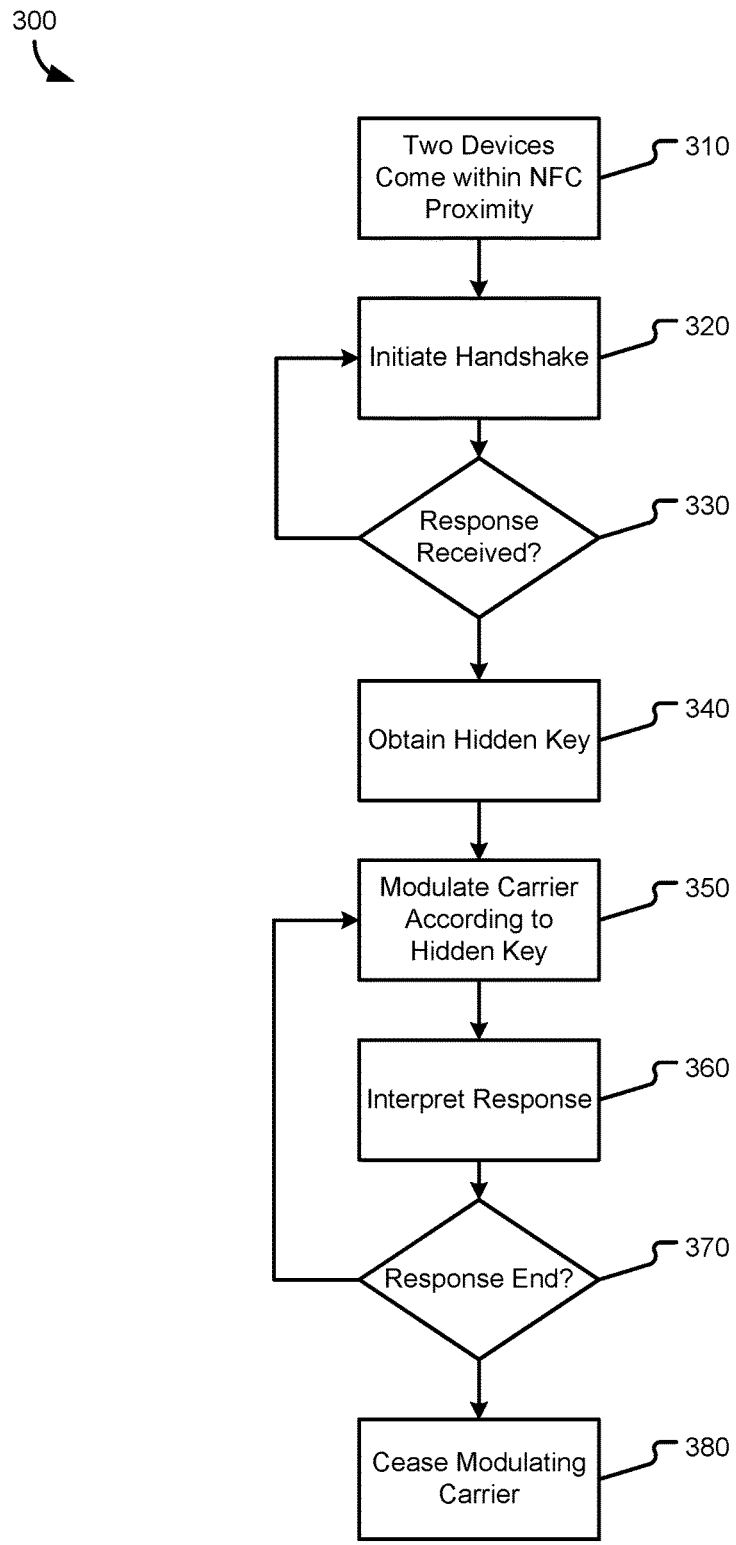
FIG. 3 is a flow chart showing general stages involved in an example method for securing Near Field Communications.

FIG. 3 is a flow chart showing general stages involved in an example method 300 for securing NFC signals from eavesdroppers. Method 300 begins at OPERATION 310, where two devices come within proximity for NFC signals to be exchanged. In various aspects, the actively communicating device 100$a$ generates an NFC signal in response to a user initiating NFC communications, or may periodically or constantly generate an initiate command signal to detect passively communicating devices 100$p$ that enter within communication proximity to the actively communicating device 100$a$. In various aspects, proximity may be set as a distance between devices (e.g., 5 cm), a minimum signal strength of the carrier wave 210 from the initiating device (e.g., at least 0.175 A/m) that can induce the target device to respond.

Once two devices are within communicative proximity, the actively communicating device 100$a$ will initiate a handshake procedure with the passively communicating device 100$p$ at OPERATION 320. During a handshake procedure for passive mode communications between devices, the initiating device (the actively communicating device 100$a$) may use a known series of data (e.g., a series of n bits encoding a known sequence via differential encoding) to set timing parameters on the target device (the passively communicating device 100$p$) and/or to provide initial power to the target device if it lacks an internal power source.

Once the handshake procedure is complete, method 300 proceeds to DECISION 330 to determine whether a response is received from the passively communicating device 100$p$. When it is determined that no response has been received within a response window, method 300 may conclude or return to OPERATION 320 to attempt the handshake procedure again to initiate communications with the passively communicating device 100$p$. When it is determined that a response has been received, method 300 continues to OPERATION 340.

At OPERATION 340 the hidden key is obtained. In various aspects, the hidden key is generated on demand bit-by-bit, where a bit with a random binary value is generated and provided to secure—and then interpret—a time frame of the data signal 220 before being discarded. In other aspects, the hidden key is generated as a series of randomly valued bits in response to a length of a message from the target device encoded in the data signal 220. In yet other aspects, a hidden key is obtained by requesting it from a memory storage device, on which the hidden key is hardcoded or produced by an external process to secure NFC signals for a given communications session.

Proceeding to OPERATION 350, the initiator device modulates the magnetic carrier 110 according to the hidden key to secure the transmission of information from the target device. In various aspects, the magnetic carrier 110 is modulated according to the hidden key in anticipation of the target device transmitting information and/or is modulated after the target device has ceased transmitting information to ensure that all of the transmission from the target device is secured by the hidden key. In other aspects, the magnetic carrier 110 is modulated according to the hidden key only for a portion of the information from the target device, such as, for example, to secure the transmission of a payload portion of a transmission frame, but not header/footer information of the transmission frame. The initiator device, in various aspects, starts encoding the hidden key onto the carrier wave 210 in response to a timed delay (such as from the end of a handshake signal), reception of a message start from the target device, or n time frames from the start of a message from the target device. In aspects using differential encoding, such as Manchester encoding, the hidden key is encoded onto the carrier wave 210 several times per each bit in the message (e.g., twice per bit) and synchronized with bit transmission to hide changes in value.

At OPERATION 360 the response from the target device is interpreted to retrieve the data signal 220 from the carrier wave 210. Depending on the modulation scheme, the initiator device may compare changes in the carrier wave's amplitude, frequency, or phase against a corresponding decoding threshold 240 that may be static or dynamic in light of the hidden key. When using a static threshold, the initiator device demodulates the carrier wave 210 to remove the effect of the hidden key, which only it knows, to properly interpret the data signal 220 encoded onto the carrier wave 210 by the target device. When using a dynamic threshold, the threshold is modulated according to the hidden key to account for its effect on the modulated carrier wave 210.

It is determined at DECISION 370 whether the response from the passively communicating device 100p has ended. In various aspects, an end-of-signal message, a span of length n time frames where the carrier wave 210 encodes only the hidden key, known message frame lengths of a given communication standard, or a message length encoded earlier onto the carrier wave 210 by the target device are used to determine when the response has ended (or to predict when it will end). When it is determined that the response has ended, method 300 proceeds to OPERATION 380. When it is determined that the response has not ended (i.e., is still ongoing), method 300 returns to OPERATION 350 for the initiator device to continue protecting the information encoded onto the carrier wave 210 by the hidden key.

At OPERATION 380 the initiator device ceases modulating the carrier wave 210. The initiator device may, in some aspects, transmit or initiate a new handshake or other request for additional information from the target device or a different target device, or method 300 may conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
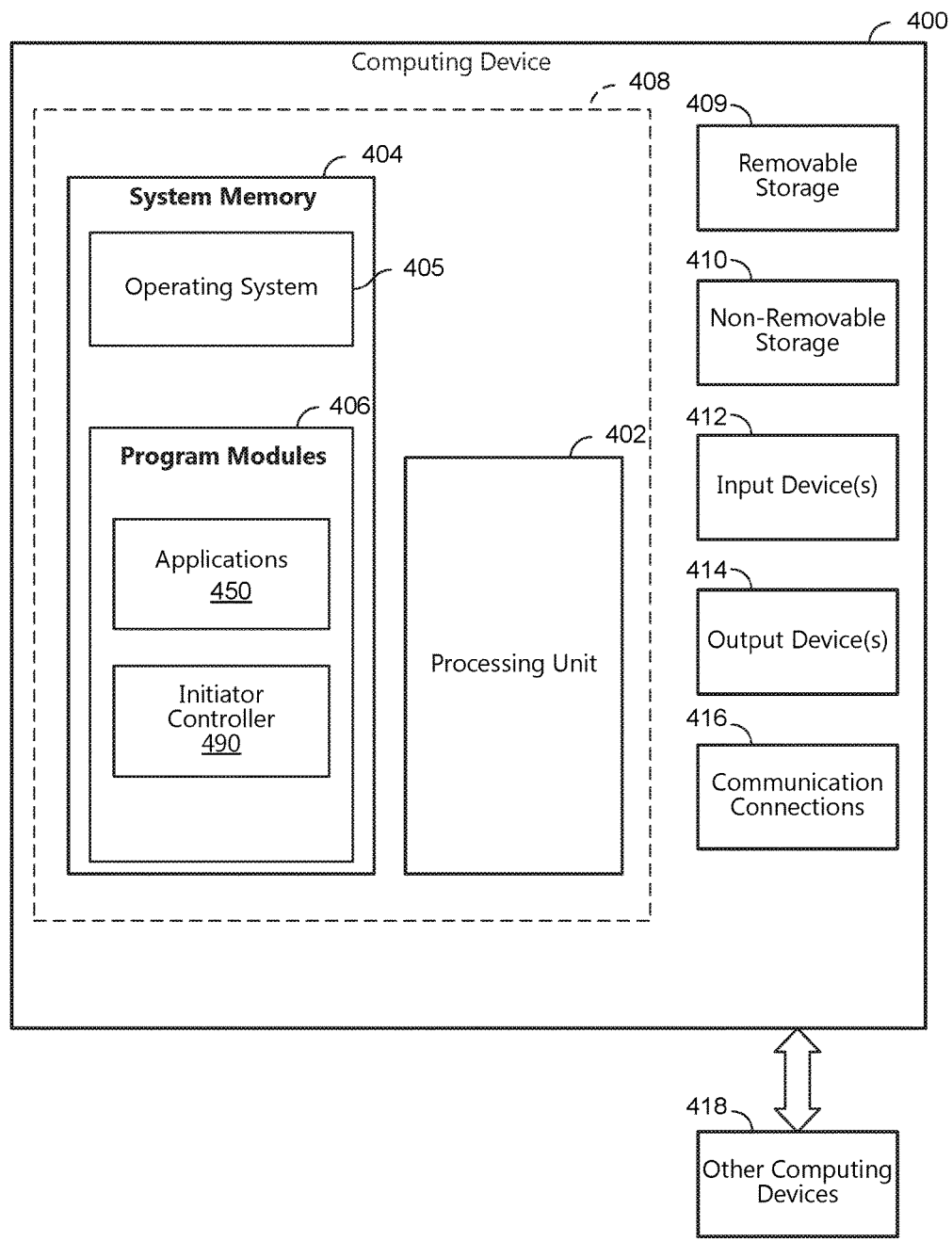
FIG. 4 is a block diagram illustrating example physical components of a computing device.
Figure 5A:
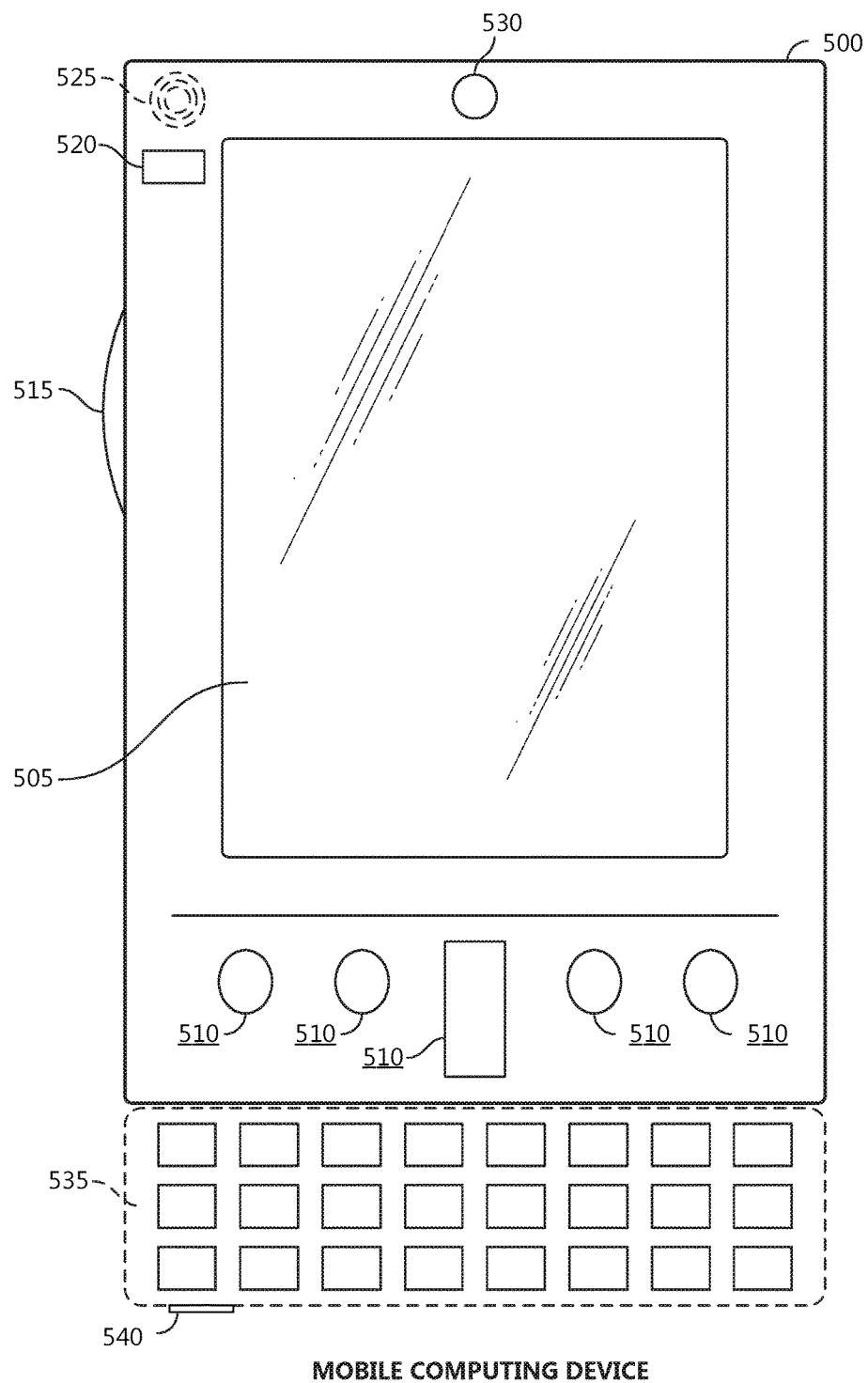
FIGS. 5A and 5B are block diagrams of a mobile computing device.
Figure 5B:
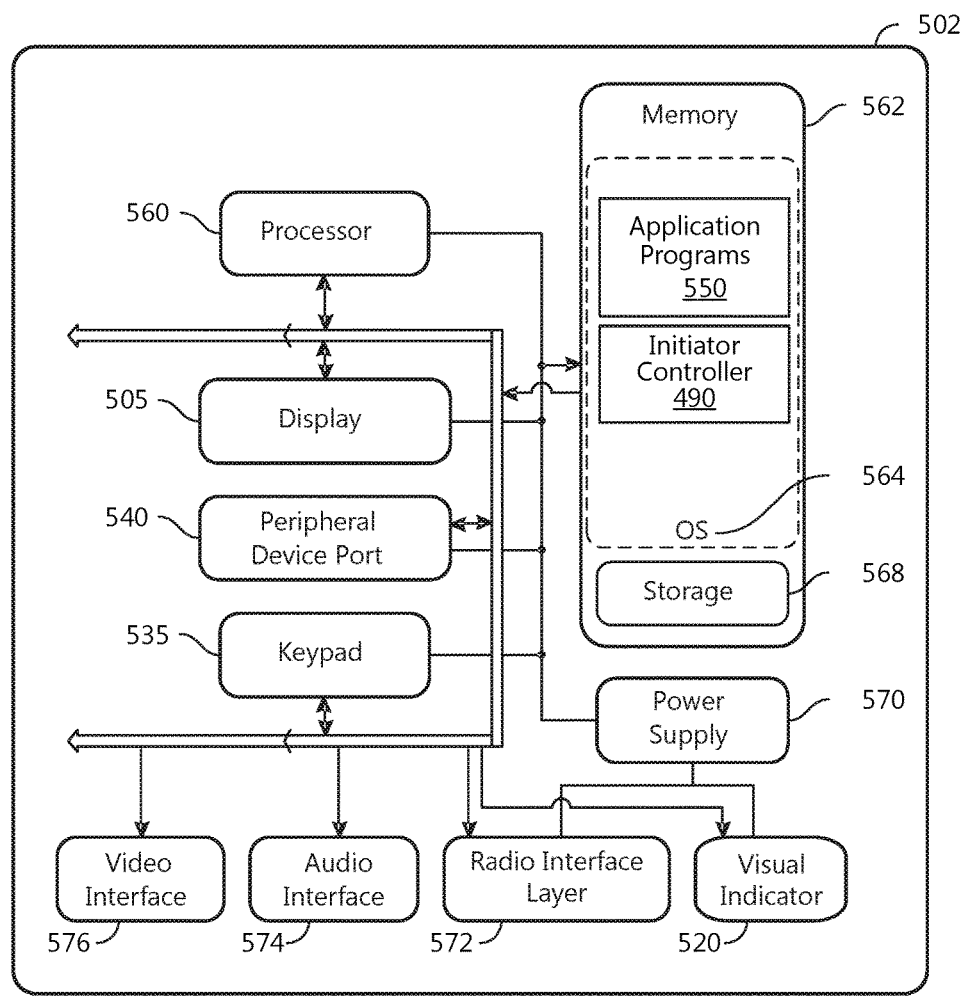

FIGS. 4, 5A, and 5B and the associated descriptions provide a discussion of a variety of operating environments in which examples are practiced. However, the devices and systems illustrated and discussed with respect to FIGS. 4, 5A, and 5B are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes an initiator controller 490 application—configured to enable the computing device 400 to act as the actively communicating device 100a. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., initiator controller 490) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, initiator controller 490 application is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for securing Near Field Communications (NFC), comprising:
   magnetically inducing, by an initiating device, an NFC carrier wave with a target device;
   initiating, by the initiating device, a handshake procedure with the target device;
   generating, on the initiating device, a hidden key;
   modulating the NFC carrier wave, by the initiating device, according to the hidden key;

receiving, by the initiating device from the target device, a data signal encoded on the NFC carrier wave modulated by the hidden key and the data signal; and interpreting, by the initiating device, the NFC carrier wave according to the hidden key to return the data signal encoded on the NFC carrier wave.

2. The method of claim 1, wherein the hidden key is generated as a series of random bits, wherein each random bit is discarded by the initiating device after being used to modulate the NFC carrier wave for a given time frame and interpret the NFC carrier wave for the given time frame.

3. The method of claim 1, wherein the NFC carrier wave is interpreted according to the hidden key to return the data signal by:

modulating a decoding threshold by the hidden key to produce a modulated threshold; and comparing the NFC carrier wave against the modulated threshold to return the data encoded on the NFC carrier wave.

4. The method of claim 1, wherein the NFC carrier wave is interpreted according to the hidden key to return the data signal by:

demodulating the NFC carrier wave by the hidden key; and comparing the demodulated NFC carrier wave against a static decoding threshold to return the data signal encoded on the NFC carrier wave.

5. The method of claim 1, wherein in response to determining that the target device has stopped encoding the data signal onto the NFC carrier wave, ceasing modulation, by the initiating device, of the NFC carrier wave according to the hidden key.

6. The method of claim 5, wherein it is determined by the initiating device that the target device has stopped encoding the data onto the NFC carrier wave according to at least one of:

an end-of-signal message encoded onto the NFC carrier; or a message length encoded onto the NFC carrier indicating a number of bits comprising the data signal.

7. The method of claim 1, wherein the initiating device begins modulating the NFC carrier according to the hidden key in response to at least one of:

a timed delay from an end of the handshake procedure; or a start-of-signal message encoded onto the NFC carrier.

8. The method of claim 1, wherein a length in bits of the hidden key and a length in bits of the data signal are equal.

9. The method of claim 1, wherein the initiating device provides power to the target device via the NFC carrier wave.

10. An actively communicating device providing secure Near Field Communications (NFC) with a passively communicating device, the actively communicating device comprising:

an antenna, configured to send and receive radio frequency signals;

a key buffer, configured to store a hidden key;

a modulator, in communication with the antenna and the key buffer, wherein the modulator is configured to:

produce a magnetic carrier wave transmitted via the antenna for communication with the passively communicating device;

encode a handshake signal onto the magnetic carrier wave to initiate communications with the passively communicating device; and in response to receiving a response to the handshake signal from the passively communicating device, encode the hidden key onto the magnetic carrier wave; and a demodulator in communication with the antenna and the key buffer, wherein the demodulator is configured to:

interpret the response from the passively communicating device by decoding a data signal encoded onto the magnetic carrier wave by the passively communicating device in light of the hidden key.

11. The actively communicating device of claim 10, wherein interpreting the response in light of the hidden key includes:

demodulating the magnetic carrier wave according to the hidden key to produce a demodulated carrier wave;

comparing an amplitude of the demodulated carrier wave to a decoding threshold across as series of timeframes;

in response to the amplitude of the demodulated carrier wave exceeding the decoding threshold at a given timeframe of the series of time frames, determining a value of the data signal at the given time frame to be ONE/TRUE; and in response to the decoding threshold exceeding the amplitude of the demodulated carrier wave at the given timeframe of the series of time frames, determining the value of the data signal at the given time frame to be ZERO/FALSE.

12. The actively communicating device of claim 10, wherein interpreting the response in light of the hidden key includes:

modulating a decoding threshold according to the hidden key to produce a modulated threshold;

comparing an amplitude of the magnetic carrier wave to the modulated threshold across as series of timeframes;

in response to the amplitude of the magnetic carrier wave exceeding the modulated threshold at a given timeframe of the series of time frames, determining a value of the data signal at the given time frame to be ONE/TRUE; and in response to the modulated threshold exceeding the amplitude of the magnetic carrier wave at the given timeframe of the series of time frames, determining the value of the data signal at the given time frame to be ZERO/FALSE.

13. The actively communicating device of claim 10, wherein the carrier wave transmits power to the passively communicating device.

14. The actively communicating device of claim 10, wherein the handshake signals an active device to enter a passive communication mode to act as the passively communicating device.

15. The actively communicating device of claim 10, wherein the key buffer is further configured to:

generate a series of random bits for use as the hidden key; and discard each random bit of the series of random bits in response to decoding the data signal encoded onto the magnetic carrier wave.

16. A system for securing Near Field Communications (NFC), comprising:

a processor; and a memory storage device including instructions, which when executed by the processor are operable to provide:

a modulator, configured to generate a carrier wave and encode data onto the carrier wave;

a demodulator, configured to observe the carrier wave to interpret data signals encoded onto the carrier wave;

a key buffer in communication with the modulator and the demodulator, configured to store a hidden key;

wherein the hidden key is encoded onto the carrier wave by the modulator to scramble a data signal received from a target device; and wherein the hidden key is used by the demodulator to unscramble the data signal received from the target device.

17. The system of claim 16, wherein the modulator and demodulator operate according to an Amplitude Modulation scheme to encode and interpret data signals.

18. The system of claim 17, wherein the demodulator is further configured to interpret data signals encoded on the carrier wave against an amplitude threshold to determine a bit value of a given data signal at a given time frame, wherein the amplitude threshold is modulated according to the hidden key.

19. The system of claim 16, wherein the key buffer is further configured to:

generate the hidden key as a series of bits having randomly assigned binary values, wherein each bit corresponds to a given time frame for the carrier wave; and in response to the demodulator unscrambling the data signal at the given time frame, remove the bit corresponding to the given time frame from storage.

20. The system of claim 16, wherein the modulator is further configured to modulate the carrier wave to produce a handshake signal unscrambled by the hidden key.

* * * * *